United States Patent
He et al.

(10) Patent No.: US 9,867,078 B2
(45) Date of Patent: Jan. 9, 2018

(54) DRX OPERATION FOR UL/DL RECONFIGURATION

(71) Applicant: Intel IP Corporation, Santa Clara, CA (US)

(72) Inventors: Hong He, Beijing (CN); Youn Hyoung Heo, San Jose, CA (US); Mo-Han Fong, Sunnyvale, CA (US); Alexey Khoryaev, Nizhny Novgorod (RU)

(73) Assignee: Intel IP Corporation, Santa Clara, CA (US)

( * ) Notice: Subject to any disclaimer, the term of this patent is extended or adjusted under 35 U.S.C. 154(b) by 0 days.

(21) Appl. No.: 14/991,696

(22) Filed: Jan. 8, 2016

(65) Prior Publication Data

US 2016/0128131 A1 May 5, 2016

Related U.S. Application Data

(63) Continuation of application No. 14/316,188, filed on Jun. 26, 2014, now Pat. No. 9,264,933.
(Continued)

(51) Int. Cl.
*H04W 76/04* (2009.01)
*H04W 72/04* (2009.01)
(Continued)

(52) U.S. Cl.
CPC ....... *H04W 28/0242* (2013.01); *G01S 5/0236* (2013.01); *H04J 3/02* (2013.01);
(Continued)

(58) Field of Classification Search
CPC ......... H04W 4/00; H04W 4/14; H04W 28/02; H04W 28/0242; H04W 28/0236;
(Continued)

(56) References Cited

U.S. PATENT DOCUMENTS 8,031,583 B2 * 10/2011 Classon .............. H04L 1/1822
370/208
8,396,068 B2 * 3/2013 Moon .................. H04L 5/0007
370/230
(Continued)

FOREIGN PATENT DOCUMENTS

CN 102075993 A 5/2011
CN 102523627 A 6/2012
(Continued)

OTHER PUBLICATIONS

Kim et al., "An Implementation of Downlink Asynchronous HARQ for LTE TDD System", IEEE 978-1-4577-1155, Aug. 2012, pp. 271-274.*
(Continued)

Primary Examiner — Tri H Phan
(74) Attorney, Agent, or Firm — Schwabe, Williamson & Wyatt, P.C.

(57) ABSTRACT

In embodiments, apparatuses, methods, and storage media may be described for identifying subframes in a radio frame on which a UE may receive a Physical Downlink Control Channel (PDCCH) or enhanced PDCCH (ePDCCH) transmission. Specifically, the UE may receive multiple indications of uplink/downlink (UL/DL) subframe configurations and identify one or more subframes in which the UE may receive the PDCCH or ePDCCH transmission. The UE may then monitor one or more of the identified subframes and base discontinuous reception (DRX) timer functionality on one or more of the identified subframes.

17 Claims, 4 Drawing Sheets

Related U.S. Application Data

(60) Provisional application No. 61/879,014, filed on Sep. 17, 2013.

(51) Int. Cl.

| | | |
|---|---|---|
| *H04W 28/02* | (2009.01) | |
| *H04W 36/04* | (2009.01) | |
| *H04W 64/00* | (2009.01) | |
| *H04W 4/14* | (2009.01) | |
| *H04L 5/00* | (2006.01) | |
| *H04W 24/10* | (2009.01) | |
| *H04W 36/00* | (2009.01) | |
| *G01S 5/02* | (2010.01) | |
| *H04J 3/02* | (2006.01) | |
| *H04W 28/12* | (2009.01) | |

(52) U.S. Cl.
CPC ............ *H04L 5/003* (2013.01); *H04L 5/0048* (2013.01); *H04W 4/14* (2013.01); *H04W 24/10* (2013.01); *H04W 28/0236* (2013.01); *H04W 28/0247* (2013.01); *H04W 28/0268* (2013.01); *H04W 36/0083* (2013.01); *H04W 36/04* (2013.01); *H04W 64/00* (2013.01); *H04W 72/0446* (2013.01); *H04W 76/048* (2013.01); *H04W 28/12* (2013.01)

(58) Field of Classification Search
CPC ......... H04W 28/0247; H04W 28/0268; H04W 28/12; H04W 52/02; H04W 76/04; H04W 76/048; H04W 72/0446; H04L 5/00; H04L 5/003; H04J 3/00; H04J 3/02; H04J 4/00; H04B 7/26; G01S 5/0236
USPC .................................................. 370/310–350
See application file for complete search history.

(56) References Cited

U.S. PATENT DOCUMENTS

| | | | | |
|---|---|---|---|---|
| 8,675,530 | B2* | 3/2014 | Li ..................... | H04W 52/0216 370/311 |
| 8,705,556 | B2* | 4/2014 | Wang ................. | H04W 72/0406 370/431 |
| 8,797,896 | B2* | 8/2014 | Li ....................... | H04B 7/15542 370/252 |
| 8,797,924 | B2* | 8/2014 | Tseng ................. | H04W 76/048 370/280 |
| 9,083,494 | B2* | 7/2015 | Zhang ................. | H04L 5/0007 |
| 9,264,933 | B2* | 2/2016 | He ..................... | H04W 28/0242 |
| 9,319,213 | B2* | 4/2016 | Yang ................... | H04L 1/1812 |
| 2010/0260164 | A1* | 10/2010 | Moon .................. | H04L 5/0007 370/345 |
| 2011/0002281 | A1* | 1/2011 | Terry ................. | H04W 52/0216 370/329 |
| 2011/0128896 | A1* | 6/2011 | Huang ................. | H04W 72/04 370/280 |
| 2011/0211522 | A1* | 9/2011 | Chung ................. | H04L 1/1822 370/315 |
| 2011/0255484 | A1* | 10/2011 | Zhang ................. | H04L 5/001 370/329 |
| 2011/0268003 | A1 | 11/2011 | Li et al. | |
| 2011/0294491 | A1* | 12/2011 | Fong ................... | H04L 5/001 455/422.1 |
| 2012/0176950 | A1* | 7/2012 | Zhang ................. | H04L 5/001 370/311 |
| 2012/0281600 | A1* | 11/2012 | Tseng ................. | H04W 76/048 370/280 |
| 2012/0281601 | A1 | 11/2012 | Kuo et al. | |
| 2013/0044651 | A1 | 2/2013 | Wang et al. | |
| 2013/0044652 | A1 | 2/2013 | Wang et al. | |
| 2013/0188532 | A1* | 7/2013 | Zhang ............... | H04W 72/0413 370/280 |
| 2013/0242819 | A1* | 9/2013 | He ..................... | H04W 28/0268 370/280 |
| 2014/0086112 | A1* | 3/2014 | Stern-Berkowitz | H04W 72/1289 370/280 |
| 2014/0086119 | A1* | 3/2014 | Yang ..................... | H04L 5/0007 370/280 |
| 2015/0172039 | A1* | 6/2015 | Kim ........................ | H04L 5/001 370/280 |
| 2015/0289246 | A1* | 10/2015 | Suzuki ..................... | H04L 5/00 370/329 |
| 2015/0341866 | A1* | 11/2015 | Park ..................... | H04W 52/146 455/522 |
| 2016/0081110 | A1* | 3/2016 | Suzuki .............. | H04W 52/0229 370/336 |
| 2016/0157226 | A1* | 6/2016 | Moon .................. | H04B 7/2656 370/280 |
| 2016/0234809 | A1* | 8/2016 | Han .................... | H04W 72/042 |

FOREIGN PATENT DOCUMENTS

| | | |
|---|---|---|
| EP | 2983418 A1 | 2/2016 |
| TW | 201320780 A | 5/2013 |
| WO | 2010/060341 A1 | 6/2010 |

OTHER PUBLICATIONS

International Search Report and Written Opinion mailed Nov. 20, 2014 from International Application No. PCT/US2014/048954.
Extended European Search Report issued Oct. 5, 2016 from European Divisional Patent Application No. 16170298.0, 8 pages.
Huawei et al., "Potential signaling enhancements for TDD eIMTA," 3GPP TSG RAN WG1 Meeting #72, R1-130445, Agenda Item: 7.3.3.3, Jan. 28-Feb. 1, 2013, St. Julian's, Malta, 6 pages.
Asustek, "DRX retransmission missing for TDD," 3GPP TSG-RAN2 Meeting #68is, R2-100226, Agenda Item: 6.8.3 TEI9—User plane related, Jan. 18-22, 2010, Valencia, Spain, 4 pages.
Ericsson, "Introduction of Carrier Aggregation," 3GPP TSG-RAN2 Meeting #71, R2-105220, 36.321 CR, Current version: 9.3.0, Aug. 23-27, 2010, Madrid, Spain, 51 pages.
CATT, "Consideration on DRX Timer," 3GPP TSG RAN WG2 Meeting #78, R2-122179, Agenda Item: 7.1.3, May 21-25, 2012, Prague, Czech Republic, 3 pages.
Office Action issued Oct. 20, 2016 from Korean Patent Application No. 10-2016-7001756, 5 pages.
Office Action issued Feb. 2, 2017 from Taiwan Patent Application No. 103130108, 6 pages.
Office Action dated Feb. 16, 2017 from Taiwan Divisional Patent Application No. 105113832, 14 pages.
Office Action dated Apr. 4, 2017 from Japanese Patent Application No. 2016-541968, 5 pages.
Office Action dated May 9, 2017 from Japanese Divisional Patent Application No. 2016-081269, 5 pages.
CATT, "Signalling mechanisms for TDD UL-DL reconfiguration," 3GPP TSG RAN WG1 Meeting #72bis, R1-130980, Agenda Item: 7.2.3.2, Apr. 15-19, 2013, Chicago, USA, 4 pages.
3GPP, "Technical Specification Group Radio Access Network; Evolved Universal Terrestrial Radio Access (E-UTRA); Medium Access Control (MAC) protocol specification (Release 11)," 3GPP TS 36.321 V11.3.0 (Jun. 2013). Lte Advanced, 57 pages.
RAN WG1, "LS on LTE_TDD_elMTA," 3GPP TSG-RAN Meeting #74, R1-134019, Release: Rel-12, Aug. 19-23, 2013, Barcelona, Spain, 2 pages.
QUALCOMM Incorporated, "DRX operation for elMTA," 3GPP TSG RAN WG1 #74, R1-133582, Agenda item: 7.2.3.2, Aug. 19-May 23, 2013, Barcelona, Spain, 3 pages.
Extended European Search Report dated Jun. 2, 2017 from European Patent Application No. 14846269.0, 7 pages.
Interdigital, "On explicit and implicit signaling for TDD UL-DL reconfiguration," 3GPP TSG-RAN WG1 Meeting 073, R1-132180, Agenda item: 6.2.3.2, May 20-24, 2013, Fukuoka, Japan, 4 pages.

(56) References Cited

OTHER PUBLICATIONS

Article 94(3) issued Jul. 4, 2017 from European Divisional Application No. 16170298.0, 6 pages.

* cited by examiner

| Frames structure 2 with flexible subframes | Subframe number | | | | | | | | | |
|---|---|---|---|---|---|---|---|---|---|---|
| | 0 | 1 | 2 | 3 | 4 | 5 | 6 | 7 | 8 | 9 |
| | D | S | U | F | F | D | S/D | F | F | F |
| Option 1 | x | x | | | | x | x | | | |
| Option 2 - Configuration 1 | x | x | | | x | x | x | | | x |
| Option 3 - Configuration 2 | x | x | | x | x | x | x | | x | x |
| Option 4 - Configuration 3 | x | x | | | | x | x | x | x | x |

Figure 2

DRX OPERATION FOR UL/DL RECONFIGURATION

CROSS REFERENCE TO RELATED APPLICATION

The present application is a continuation of U.S. patent application Ser. No. 14/316,188, filed Jun. 26, 2014, entitled "DRX OPERATION FOR UL/DL RECONFIGURATION," which claims priority to U.S. Provisional Patent Application No. 61/879,014, filed Sep. 17, 2013, entitled "Advanced Wireless Communication Systems and Techniques". The entire disclosures of which are hereby incorporated by reference in their entireties.

FIELD

Embodiments of the present invention relate generally to the technical field of discontinuous reception (DRX) functionality in radio frames.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure. Unless otherwise indicated herein, the approaches described in this section are not prior art to the claims in the present disclosure and are not admitted to be prior art by inclusion in this section.

DRX functionality may be used to save battery power in a user equipment (UE) of a wireless network by skipping reception of signals in the physical downlink control channel (PDCCH) or enhanced PDCCH (ePDCCH). Specifically, the UE may monitor one or more radio subframes of the radio frame in a wireless network for a PDCCH/ePDCCH signal. However, in uplink (UL) subframes of the radio frame, the UE may not monitor for a PDCCH/ePDCCH signal. Additionally, DRX functionality may involve one or more timers, and if those timers have expired or are not running, the UE may not monitor for a PDCCH/ePDCCH signal.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

FIG. 2 illustrates an example of options for monitoring different uplink/downlink (UL/DL) subframe configurations, in accordance with various embodiments.

DETAILED DESCRIPTION

In embodiments, apparatuses, methods, and storage media may be described for identifying subframes in a radio frame on which a UE may receive a PDCCH/ePDCCH transmission (herein collectively referred to as a PDCCH transmission). Specifically, the UE may receive multiple indications of UL/DL subframe configurations and identify one or more subframes in which the UE may receive the PDCCH transmission. The UE may then monitor one or more of the identified subframes and base DRX timer functionality on one or more of the identified subframes.

In some embodiments, the UE may receive conflicting UL/DL subframe configurations, for example, in a system information block type 1 (SIB1) message, a PDCCH transmission, or radio resource control (RRC) signaling. For example, a UL subframe in one of the UL/DL configurations may be a DL or special subframe (i.e., a subframe that may include a Downlink Pilot Time Slot (DwPTS)). The UE may identify, based on the conflicting UL/DL subframe configurations, which subframes to use for the PDCCH monitoring and the DRX functionality.

In the following detailed description, reference is made to the accompanying drawings that form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

Figure 1:
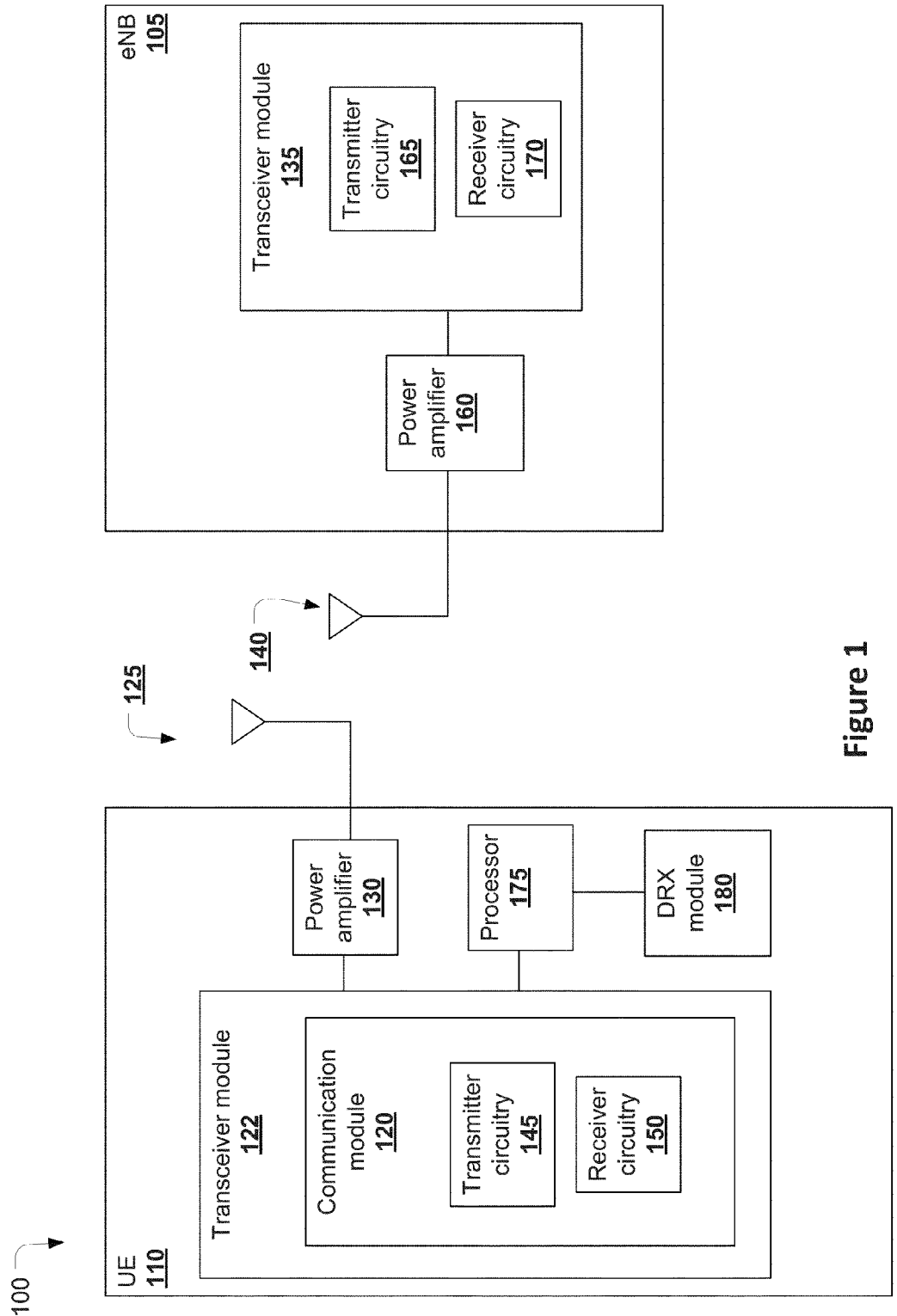
FIG. 1 schematically illustrates an example of a network comprising a UE and an eNodeB (eNB), in accordance with various embodiments.

FIG. 1 schematically illustrates an example wireless network 100 (hereinafter "network 100") in accordance with various embodiments. The network 100 may include a UE such as UE 110 coupled with an eNB 105. In some embodiments, the network 100 may be an access network of a third generation partnership project (3GPP) long term evolution (LTE) network such as evolved universal terrestrial radio access network (E-UTRAN). In these embodiments the eNB 105 may be a 3GPP-defined eNodeB (also referred to as an evolved NodeB) configured to wirelessly communicate with the UE 110 using a wireless protocol such as the 3GPP LTE wireless protocol.

As shown in FIG. 1, the UE 110 may include a transceiver module 122, which may also be referred to as a multi-mode transceiver chip. The transceiver module 122 may be configured to transmit and receive wireless signals. Specifically, the transceiver module 122 may be coupled with one or more of a plurality of antennas 125 of the UE 110 for communicating wirelessly with other components of the network 100, e.g., eNB 105 or another UE. The antennas 125 may be powered by a power amplifier 130 which may be a component of the transceiver module 122, or coupled with the transceiver module 122 and generally between the transceiver module 122 and the antennas 125 as shown in FIG. 1. In one embodiment, the power amplifier 130 may provide the power for all transmissions on the antennas 125. In other embodiments, there may be multiple power amplifiers on the UE 110. The use of multiple antennas 125 may allow for the UE 110 to use transmit diversity techniques such as spatial orthogonal resource transmit diversity (SORTD), multiple-input multiple-output (MIMO), or full-dimension MIMO (FD-MIMO).

In certain embodiments the transceiver module 122 may include a communication module 120, which may be referred to as a broadband module. Communication module 120 may contain both transmitter circuitry 145 configured to cause the antennas 125 to transmit one or more signals from the UE 110, and receiver circuitry 150 configured to cause the antennas 125 to receive one or more signals at the UE 110. In other embodiments, the communication module 120 may be implemented in separate chips or modules, for example, one chip including the receiver circuitry 150 and another chip including the transmitter circuitry 145. In some embodiments the signals may be cellular signals transmitted to or received from a 3GPP eNB such as eNB 105. In some embodiments, the UE 110 may include a processor 175 coupled to the transceiver module 122. The processor 175 may further be coupled with or include a DRX module 180 that may be configured to perform one or more of the DRX functions described in further detail below.

Similarly to the UE 110, the eNB 105 may include a transceiver module 135. The transceiver module 135 may be further coupled with one or more of a plurality of antennas 140 of eNB 105 for communicating wirelessly with other components of the network 100, e.g., UE 110. The antennas 140 may be powered by a power amplifier 160 which may be a component of the transceiver module 135, or may be a separate component of the eNB 105, and generally positioned between the transceiver module 135 and the antennas 140 as shown in FIG. 1. In one embodiment, the power amplifier 160 may provide the power for all transmissions on the antennas 140. In other embodiments, there may be multiple power amplifiers on the eNB 105. The use of multiple antennas 140 may allow for the eNB 105 to use transmit diversity techniques such as SORTD, MIMO, or FD-MIMO. In certain embodiments the transceiver module 135 may contain both transmitter circuitry 165 configured to cause the antennas 140 to transmit one or more signals from the eNB 105, and receiver circuitry 170 configured to cause the antennas 140 to receive one or more signals at the eNB 105. In other embodiments, the transceiver module 135 may be replaced by transmitter circuitry 165 and receiver circuitry 170 which are separate from one another (not shown). In some embodiments, though not shown, the transceiver module 135 may include a communication module such as communication module 120 that includes the receiver circuitry 170 and the transmitter circuitry 165.

As described above, DRX functionality may be used in a network such as network 100 to preserve the battery life of a UE such as UE 110. Specifically, the DRX functionality may preserve the battery by allowing the UE to enter a low power or sleep state where the UE does not monitor for a DL signal on the PDCCH. Dependent on how predictable the traffic arrival rate may be in the network 100, and based on quality of service (QoS) requirements associated with the radio bearer of the network 100, an eNB such as eNB 105 may configure a single DRX interval for the UE to use in LTE systems such as network 100. It will be noted that the below discussion that refers to the PDCCH or PDCCH signals may additionally apply to ePDCCH or ePDCCH signals. However, for ease of reference, only the PDCCH will be referred to below.

In some embodiments, the network 100 may be configured as a time division duplexing (TDD) network. Specifically, in some embodiments a radio frame may be 10 milliseconds (ms) long. The radio frame may include 10 subframes of the radio frame, each subframe being 1 ms long. A subframe of the radio frame may be designated as a UL, a DL, or a special subframe. A UL subframe may be a subframe designated for a transmission from the UE such as UE 110 to an eNB such as eNB 105. A DL subframe may be a subframe designated for a transmission from the eNB 105 to the UE 110. A special subframe may be a subframe that may carry or include a DwPTS transmitted from the eNB 105 to the UE 110.

Whether a subframe of a radio frame is designated as a UL subframe, a DL subframe, or a special subframe may be indicated by a UL/DL configuration of the radio frame. Table 1, below, depicts various UL/DL configurations that may be used in some embodiments. The UL/DL configurations depicted in Table 1 may specifically apply to 3GPP radio frames with Frame Structure 2. In other embodiments, other UL/DL configurations may be used. In Table 1, "D" may indicate a DL subframe. "U" may indicate a UL subframe. "S" may indicate a special subframe

TABLE 1

| UL/DL Config-uration | Subframe Number | | | | | | | | | |
|---|---|---|---|---|---|---|---|---|---|---|
| | 0 | 1 | 2 | 3 | 4 | 5 | 6 | 7 | 8 | 9 |
| 0 | D | S | U | U | U | D | S | U | U | U |
| 1 | D | S | U | U | D | D | S | U | U | D |
| 2 | D | S | U | D | D | D | S | U | D | D |
| 3 | D | S | U | U | U | D | D | D | D | D |
| 4 | D | S | U | U | D | D | D | D | D | D |
| 5 | D | S | U | D | D | D | D | D | D | D |
| 6 | D | S | U | U | U | D | S | U | U | D |

For TDD carriers in such TDD networks, DRX operation may be based on subframes where a PDCCH signal may be received by the UE. Specifically, the UE may receive a PDCCH signal either in a DL subframe, or a special subframe (i.e., a subframe that may include a DwPTS), herein collectively referred to for ease of reference as "PDCCH subframes." Specifically, the UE may monitor for the PDCCH only in the PDCCH subframes, and not monitor for the PDCCH signal in a UL subframe. Further, the UE may monitor for the PDCCH in the PDCCH subframes only when an active DRX related timer is running, or an uplink grant is pending.

As described below, a running DRX related timer may only increment during the PDCCH subframes in which it is running, and not increment during a UL subframe. For example, a DRX related timer with a value of x in PDCCH subframe y may increment to value x+1 in PDCCH subframe y+1. The values of x and y may be irrespective of whether there are one or more UL subframes between PDCCH subframe y and PDCCH subframe y+1. Once the DRX timer reaches a set value, the timer may expire as described below.

In embodiments, there may be three DRX timers used in the TDD network 100. These timers may include a DRX duration timer (referred to herein as onDurationTimer), a DRX inactivity timer (referred to herein as DRX-InactivityTimer), or a DRX retransmission timer (referred to herein as DRX-RetransmissionTimer). The onDurationTimer may indicate the number of PDCCH subframes in the radio frame that the UE 110 should monitor for a PDCCH signal. For example, if the subframes in the radio frame are numbered 0-9, an onDurationTimer value of 2 may indicate that the UE 110 should monitor subframes 0 and 1 for a PDCCH signal (assuming that subframes 0 and 1 are PDCCH subframes).

The DRX-InactivityTimer may indicate the number of PDCCH subframes that the UE 110 should monitor for a PDCCH signal after a first PDCCH signal is received in the radio frame.

As a concrete example, assume that the radio frame is configured with UL/DL configuration 0, the value of onDurationTimer is 2, and the value of DRX-InactivityTimer is 2. As can be seen in Table 1, subframes 0, 1, 5, and 6 may be PDCCH subframes. Subframes 2-4 and 7-9 may not be PDCCH subframes.

Based on onDurationTimer, the UE 110 may monitor subframes 0 and 1 (which are DL and special subframes, respectively, and therefore both PDCCH subframes) for a PDCCH signal. If the UE 110 does not receive a PDCCH signal in subframes 0 or 1, then the UE 110 may not monitor subframes 2-9 for a PDCCH signal, for example, by entering the low-power or sleep mode.

However, if the UE 110 receives a PDCCH signal in subframe 0, then the UE may stay awake beyond the value indicated by onDurationTimer and monitor PDCCH subframes based on the DRX-InactivityTimer value. For example, based on the value of the DRX-InactivityTimer, which is 2, the UE 110 may monitor two additional PDCCH subframes past subframe 0 for a PDCCH signal. In this example, then the UE 110 may monitor PDCCH subframes 0, 1, and 5 for a PDCCH signal. As noted above, subframes 2-4 may not be PDCCH subframes, and so the UE may not monitor for a PDCCH signal in subframes 2-4, for example, by entering a DRX low-power or sleep mode. Additionally, upon expiration of the DRX-InactivityTimer, the UE may enter the DRX low-power or sleep mode for subframes 6-9. Similarly, if the UE 110 receives a PDCCH signal in subframe 1, then the UE 110 may, based on the DRX-InactivityTimer, monitor PDCCH subframes 5 and 6 for a PDCCH signal, and enter the DRX low-power or sleep mode for PDCCH subframes 2-4 and 7-9.

The DRX-Retransmission Timer may relate to the UE 110 monitoring for one or more scheduled DL Hybrid Automatic Repeat request (HARQ) retransmissions. Specifically, with the DRX-Retransmission Timer, the UE 110 may be configured to monitor PDCCH subframes for a PDCCH signal from the first possible instance of a HARQ retransmission as long as the UE 110 or eNB 105 have schedulable pending retransmissions.

In some embodiments it has been observed that this semi-static allocation of UL and DL subframes and the UL/DL configurations described above in Table 1 may not be appropriate for the current traffic situation of the network 100, and therefore may result in unoptimized spectrum utilization. Therefore, in some embodiments a radio frame may include "flexible" subframes (also referred to as FlexSF). A flexible subframe may be a subframe that is capable of UL or DL traffic. In some embodiments, the direction of the flexible subframe may be dynamically configured by an eNB such as eNB 105. With these flexible subframes, the eNB 105 may be able to dynamically configure flexible subframes to match the current traffic situation of the network 100. The subframes may be appropriate, for example, in LTE networks such as a release 12 (Rel-12) LTE network configured to use enhanced interference mitigation and traffic adaptation (eIMTA). In some embodiments, a flexible subframe may be one or more of subframes 3, 4, or 6-9 of the radio frame. Specifically, in some embodiments subframes 3, 4, and 7-9 may be either UL or DL subframes. Subframe 6 may be a special subframe or a DL subframe.

However, because certain subframes of the radio frame may be either UL or DL subframes, it may be difficult to identify which subframes of the radio frame are PDCCH subframes. It may be particularly difficult to identify which subframes of the radio frame are PDCCH subframes if multiple UL/DL configurations are indicated by the eNB 105 to the UE 110. Therefore it may be difficult to identify when a DRX timer should be incremented, or when the UE 110 should be monitoring for a PDCCH signal. It may also be inefficient for the UE 110 to monitor all PDCCH and flexible subframes for a PDCCH signal, because doing so may significantly decrease the battery life of the UE 110.

In some embodiments, three UL/DL configurations may be independently signaled by an eNB such as eNB 105 to a UE such as UE 110. First, the eNB 105 may signal a UL/DL configuration to the UE 110 in a SIB1 message, herein referred to as the SIB1 UL/DL configuration. The SIB1 UL/DL configuration may be applicable to a plurality of radio frames.

Secondly, the eNB 105 may signal a UL/DL configuration to a UE 110 in a PDCCH or ePDCCH message in a first subframe or higher-layer configured subframe of a radio frame. For ease of reference, the UL/DL configuration signaled in the PDCCH subframe will be referred to herein as an "actual" UL/DL configuration. In some embodiments, the actual UL/DL configuration may only be applicable to the radio frame that the PDCCH subframe is a part of. For example, the actual UL/DL configuration may be signaled in subframe 0 of the radio frame, and apply to that radio frame. In other embodiments, the UL/DL configuration signal then the PDCCH subframe may be applicable to a subsequent radio frame.

Thirdly, the eNB 105 may signal a UL/DL configuration to the UE 110 via radio resource control (RRC) signaling. This UL/DL configuration will be referred to as a "DL-reference" UL/DL configuration. Similarly to the SIB 1 UL/DL configuration, the DL-reference UL/DL configuration may be applicable to a plurality of radio frames. The DL-reference UL/DL configuration may be generally applicable to a determination of DL HARQ timing associated with Physical Downlink Shared Channel (PDSCH) reception. In some embodiments, the DL-reference UL/DL configuration may be associated with a HARQ round-trip time (RTT) that may be set to k+4 subframes, where k is the interval between the DL transmission and that UL transmission of associated HARQ feedback according to the DL-reference UL/DL configuration.

FIG. 2 depicts four different Options for identifying a UL/DL configuration that the UE 110 should use to monitor for a PDCCH signal and increment a DRX timer for a radio frame configured according to Frame Structure 2 and including flexible subframes. As shown in FIG. 2, subframes 0 and 5 may be DL subframes, subframe 1 may be a special subframe, and subframe 2 may be an uplink subframe according to Frame Structure 2. Additionally, subframes 3, 4, and 7-9 may be flexible subframes according to Frame Structure 2, wherein the subframes may be either UL or DL subframes. Finally, subframe 6 may be either a special or DL subframe according to Frame Structure 2. For ease of reference, assume that the configurations indicated in FIG. 2, for example, with respect to Option 2, Option 3, and Option 4, refer to the UL/DL configurations indicated above in Table 1.

As a first, and simplest, Option (indicated in FIG. 2 as Option 1), the UE 110 may base PDCCH monitoring and DRX timer functionality only on the PDCCH subframes that are PDCCH subframes in each possible UL/DL configuration that may be indicated by the SIB1 message. As shown in FIG. 2 according to the subframes marked with an "X" for Option 1, PDCCH subframes may be subframes 0, 1, 5, and 6. The reason that subframes 0, 1, 5, and 6 may be PDCCH subframes for each possible UL/DL configuration may be seen in Table 1, where for each of the seven UL/DL configurations shown, subframes 0, 1, 5, and 6 may be either DL or special subframes.

As a second Option (indicated in FIG. 2 as Option 2), the UE 110 may base PDCCH monitoring and DRX timer functionality only on the PDCCH subframes that are identified as PDCCH subframes in the SIB1 UL/DL configuration. For example, in this option, if the SIB1 UL/DL configuration is UL/DL configuration 1 of Table 1, then the PDCCH subframes may be subframes 0, 1, and 4-6. Both Options 1 and 2 may provide the benefit of allowing the DRX state at UE 110 to be predictable, and help ensure no mismatch between the UE 110 and eNB 105 due to counting static DL subframes only for DRX operation. Therefore, undesirable data loss may be avoided.

As a third Option (indicated in FIG. 2 as Option 3), the UE 110 may base PDCCH monitoring and DRX timer functionality only on the PDCCH subframes that are identified as PDCCH subframes in the DL-reference UL/DL configuration. For example, in this Option, if the DL-reference UL/DL configuration is UL/DL configuration 2 of Table 1, then the PDCCH subframes may be subframes 0, 1, 3-6, 8, and 9.

In some embodiments, it may be seen that Options 1, 2, or 3 may lead to that PDCCH monitoring decoupling from the "PDCCH subframe" definition used for legacy DRX timers. Specifically, flexible subframes may be monitored for a PDCCH signal according to a common UL/DL configuration for a plurality of UEs, but they may not be counted for the purposes of the DRX timer at UE 110.

As a fourth Option (indicated in FIG. 2 as Option 4), the UE 110 may base PDCCH monitoring and DRX timer functionality only on the PDCCH subframes that are identified as PDCCH subframes in the actual UL/DL configuration. For example, in this Option, if the actual UL/DL configuration is UL/DL configuration 3 of Table 1, then the PDCCH subframes may be subframes 0, 1, and 5-9. This Option may have the benefit of keeping the number of scheduling opportunities for the UE 110 constant over time regardless of the changing of transmission direction in the flexible subframes, thereby optimizing UE battery consumption.

In some embodiments, for networks utilizing the Option 4, the UE 110 may miss a common downlink control information (DCI) transmission for a group of UE, which may result in misalignment between the active UE 110 and eNB 105 with regard to UL/DL subframes of the actual UL/DL configuration being used. As a consequence, UE 110 and eNB 105 may fall out of sync on the DRX state and/or DRX timer, or follow different DRX patterns. In some embodiments, the UE 110 may default to Option 1 as a fallback position.

In some embodiments, different UL/DL configurations may be used for different DRX timers. For example, the onDurationTimer and DRX-InactivityTimer may be based on a different UL/DL configuration than the DRX-RetransmissionTimer because the DRX-RetransmissionTimer may be more directly related to HARQ operation of the network 100, while the other two timers are not. For example, the onDurationTimer and DRX-InactivityTimer may be optimized using Options 1, 2, or 4. By contrast, because the DRX-RetransmissionTimer is more closely related to HARQ retransmissions, the DL-reference UL/DL configuration described with respect to Option 3 may be more appropriate for that timer.

As can be seen in FIG. 2, one UL/DL configuration may indicate a PDCCH subframe in a flexible subframe, while another of the UL/DL configurations indicates a UL subframe. For example, UL/DL configuration 1, depicted with respect to Option 2, may indicate that flexible subframe 3 is a UL subframe, while UL/DL configuration 2, depicted with respect to Option 3, may be a PDCCH subframe. However, by selecting one of Options 1 through 4, the network 100 may be able to more effectively utilize DRX functionality and PDCCH monitoring in situations where one of the UL/DL configurations received by the UE 110 conflicts with another of the UL/DL configurations received by the UE 110.

Figure 3:
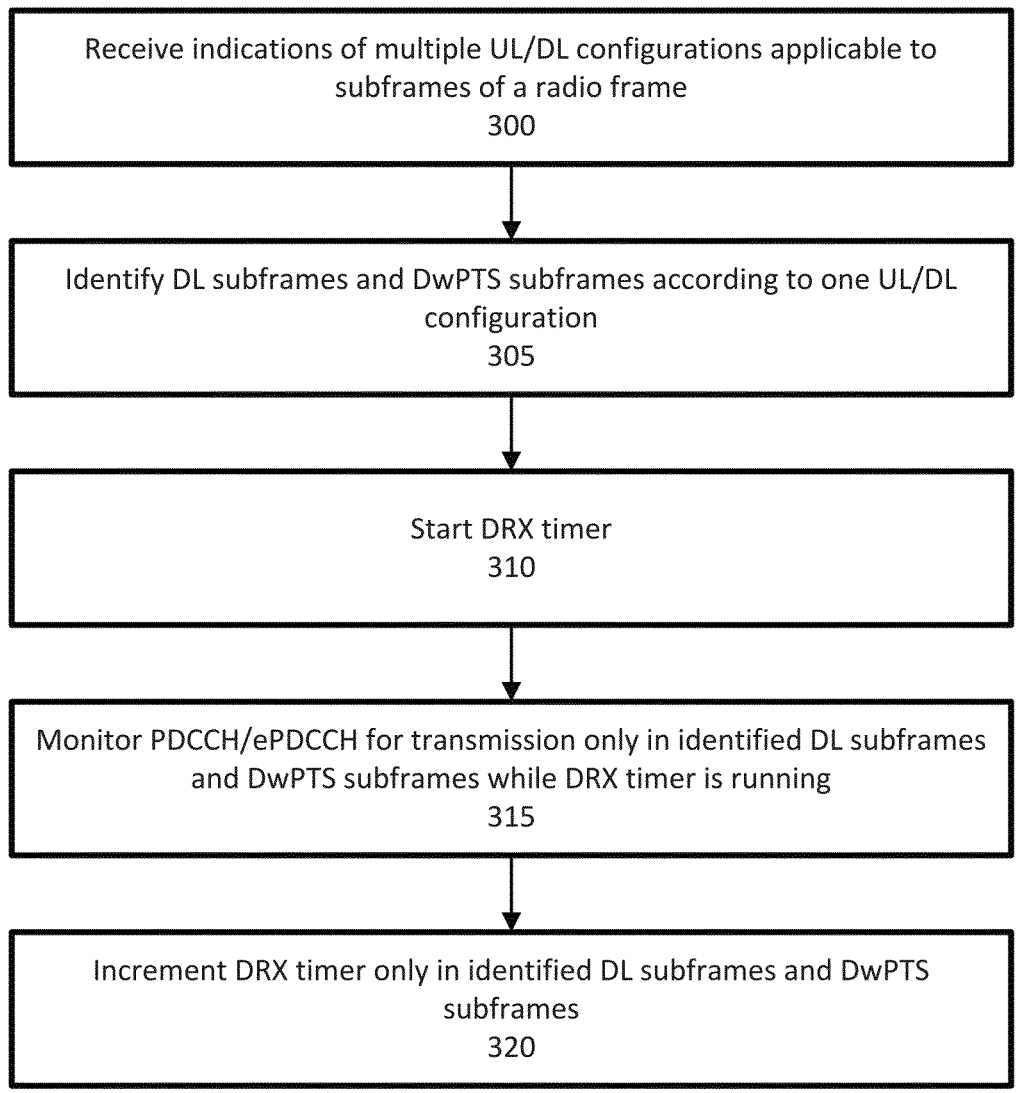
FIG. 3 depicts an example process for monitoring PDCCH transmissions in various UL/DL subframe configurations, in accordance with various embodiments.

FIG. 3 depicts an example process that may be performed by a UE such as UE 110. Initially, the UE 110 may receive indications of multiple UL/DL configurations applicable to subframes of a radio frame at 300. For example, the UE 110 may receive indications of one or more of the SIB1 UL/DL configuration, the actual UL/DL configuration, or the DL-reference UL/DL configuration.

Next, the UE 110 may identify DL subframes and subframes that may include a DwPTS according to one of the received UL/DL configurations at 305, and start a DRX timer at 310. The DRX timer may be, for example, one of the DRX timers described above. The DL subframes or DwPTS subframes may be a PDCCH subframe as described above.

Next, the UE 110 may monitor the PDCCH or ePDCCH for a transmission in the identified DL subframes and subframes that may include a DwPTS (i.e., the PDCCH subframes) while the DRX timer is running at 315. Additionally, the UE 110 may increment the DRX timer only in the identified DL subframes and subframes that may include the DwPTS at 320, as described above. That is, a DRX related timer with a value of x in PDCCH subframe y may increment to value x+1 in PDCCH subframe y+1, regardless of whether there is a non-PDCCH (i.e., a UL) subframe between PDCCH subframe y and PDCCH subframe y+1. Once the DRX timer reaches a set value, the timer may expire as described above.

Figure 4:
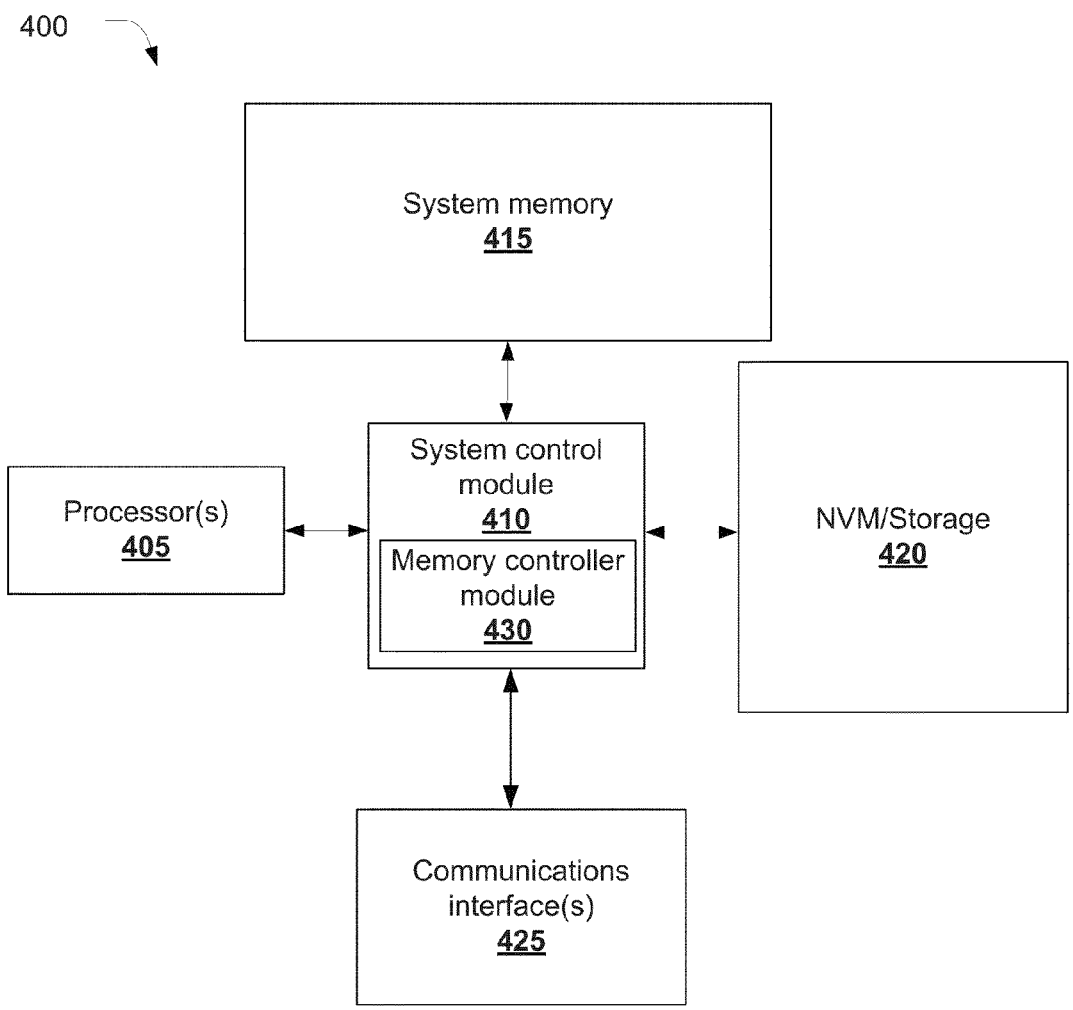
FIG. 4 schematically illustrates an example system that may be used to practice various embodiments described herein.

Embodiments of the present disclosure may be implemented into a system using any suitable hardware and/or software to configure as desired. FIG. 4 schematically illustrates an example system 400 that may be used to practice various embodiments described herein. FIG. 4 illustrates, for one embodiment, an example system 400 having one or more processor(s) 405, system control module 410 coupled to at least one of the processor(s) 405, system memory 415 coupled to system control module 410, non-volatile memory (NVM)/storage 420 coupled to system control module 410, and one or more communications interface(s) 425 coupled to system control module 410.

In some embodiments, the system 400 may be capable of functioning as the UE 110 as described herein. In other embodiments, the system 400 may be capable of functioning as eNB 105, as described herein. In some embodiments, the system 400 may include one or more computer-readable media (e.g., system memory or NVM/storage 420) having instructions and one or more processors (e.g., processor(s) 405) coupled with the one or more computer-readable media and configured to execute the instructions to implement a module to perform actions described herein.

System control module 410 for one embodiment may include any suitable interface controllers to provide for any suitable interface to at least one of the processor(s) 405 and/or to any suitable device or component in communication with system control module 410.

System control module 410 may include memory controller module 430 to provide an interface to system memory 415. The memory controller module 430 may be a hardware module, a software module, and/or a firmware module.

System memory 415 may be used to load and store data and/or instructions, for example, for system 400. System memory 415 for one embodiment may include any suitable volatile memory, such as suitable dynamic random-access memory (DRAM), for example. In some embodiments, the system memory 415 may include double data rate type four synchronous DRAM (DDR4 SDRAM).

System control module 410 for one embodiment may include one or more input/output (I/O) controller(s) to provide an interface to NVM/storage 420 and communications interface(s) 425.

The NVM/storage 420 may be used to store data and/or instructions, for example. NVM/storage 420 may include any suitable non-volatile memory, such as flash memory, for example, and/or may include any suitable non-volatile storage device(s), such as one or more hard disk drive(s) (HDD(s)), one or more compact disc (CD) drive(s), and/or one or more digital versatile disc (DVD) drive(s), for example.

The NVM/storage 420 may include a storage resource physically part of a device on which the system 400 may be installed or it may be accessible by, but not necessarily a part of, the device. For example, the NVM/storage 420 may be accessed over a network via the communications interface(s) 425.

Communications interface(s) 425 may provide an interface for system 400 to communicate over one or more network(s) and/or with any other suitable device. The system 400 may wirelessly communicate with the one or more components of the wireless network in accordance with any of one or more wireless network standards and/or protocols. In some embodiments the communications interface(s) 425 may include the transceiver modules 122 or 135.

For one embodiment, at least one of the processor(s) 405 may be packaged together with logic for one or more controller(s) of system control module 410, e.g., memory controller module 430. For one embodiment, at least one of the processor(s) 405 may be packaged together with logic for one or more controllers of system control module 410 to form a System in Package (SiP). For one embodiment, at least one of the processor(s) 405 may be integrated on the same die with logic for one or more controller(s) of system control module 410. For one embodiment, at least one of the processor(s) 405 may be integrated on the same die with logic for one or more controller(s) of system control module 410 to form a System on Chip (SoC).

In some embodiments the processor(s) 405 may include or otherwise be coupled with one or more of a graphics processor (GPU) (not shown), a digital signal processor (DSP) (not shown), wireless modem (not shown), digital camera or multimedia circuitry (not shown), sensor circuitry (not shown), display circuitry (not shown), and/or global positioning satellite (GPS) circuitry (not shown).

In various embodiments, the system 400 may be, but is not limited to, a server, a workstation, a desktop computing device, or a mobile computing device (e.g., a laptop computing device, a handheld computing device, a tablet, a netbook, a smart phone, a gaming console, etc.). In various embodiments, the system 400 may have more or less components, and/or different architectures. For example, in some embodiments, the system 400 includes one or more of a camera, a keyboard, a liquid crystal display (LCD) screen (including touch screen displays), a non-volatile memory port, multiple antennas, a graphics chip, an application-specific integrated circuit (ASIC), and speakers.

EXAMPLES

A first example may include a user equipment (UE) comprising: a processor to identify, based only on downlink (DL) subframes and subframes that include a downlink pilot time slot (DwPTS) in a first uplink/downlink (UL/DL) configuration in a plurality of received UL/DL configurations, DL subframes and subframes that include a DwPTS in a radio frame, wherein at least one of the DL subframes and subframes that include a DwPTS in the first UL/DL configuration is identified as a UL subframe in the radio frame based on a second UL/DL configuration in the plurality of received UL/DL configurations; and a discontinuous reception (DRX) module to: increment a running DRX timer based on one of the at least one of the DL subframes and subframes that include a DwPTS; and monitor the one of the at least one of the DL subframes and subframes that include a DwPTS for a Physical Downlink Control Channel (PDCCH) transmission or an enhanced PDCCH (ePDCCH) transmission.

Example 2 may include the UE of example 1, wherein the UE is an enhanced interference mitigation and traffic adaptation (eIMTA)-enabled UE.

Example 3 may include the UE of example 1, wherein the DRX timer is a DRX duration timer, a DRX inactivity timer, or a DRX retransmission timer.

Example 4 may include the UE of example 1, wherein the first or second UL/DL configurations are a UL/DL configuration received by the UE in a system information block type 1 (SIB1) message from an eNodeB (eNB), a UL/DL configuration received by the UE via radio resource control (RRC) signaling, or a UL/DL configuration received by the UE in a PDCCH or an ePDCCH message in a first subframe or higher-layer configured subframes of one radio frame.

Example 5 may include the UE of example 4, wherein the first UL/DL configuration is the UL/DL configuration received by the UE in the SIB1 message, and wherein the DL subframes and subframes that include a DwPTS in the radio frame are DL subframes or subframes that include a DwPTS in a plurality of possible UL/DL configurations indicated in the SIB1 message.

Example 6 may include the UE of example 4, wherein the first UL/DL configuration is the UL/DL configuration indicated in the SIB1 message.

Example 7 may include the UE of example 4, wherein the first UL/DL configuration is the second UL/DL configuration that is configured by RRC signaling.

Example 8 may include the UE of example 4, wherein the first UL/DL configuration is the UL/DL configuration that is received by the UE in the PDCCH or the ePDCCH message in a first subframe or higher-layer configured subframes of one radio frame.

Example 9 may include the UE of any of examples 1-8, further comprising display circuitry coupled with the processor.

Example 10 may include one or more non-transitory computer-readable media comprising instructions configured to, upon execution of the instructions by one or more processors of a user equipment (UE), cause the UE to: identify a plurality of uplink/downlink (UL/DL) configurations applicable to subframes in a plurality of radio frames; identify an indicated UL/DL configuration received in a Physical Downlink Control Channel (PDCCH) or an enhanced PDCCH (ePDCCH) message in a first subframe or higher-layer configured subframes of a radio frame in the plurality of radio frames, the indicated UL/DL configuration applicable to a plurality of subframes in the radio frame; identify DL subframes and subframes that include a downlink pilot time slot (DwPTS) in the radio frame based only on a first one of the UL/DL configurations in the plurality of UL/DL configurations and the indicated UL/DL configuration, wherein at least one of the DL subframes or subframes that include a DwPTS are a UL subframe in a second one of the UL/DL configurations and the indicated UL/DL configuration; increment a running discontinuous reception (DRX) timer based only on the identified DL subframes and subframes that include a DwPTS; and monitor the identified DL subframes and subframes that include a DwPTS for a PDCCH message while the DRX timer is running.

Example 11 may include the one or more non-transitory computer-readable media of example 10, wherein a UL/DL configuration in the plurality of UL/DL configurations is received in a system information block type 1 (SIB1) message from an eNodeB (eNB).

Example 12 may include the one or more non-transitory computer-readable media of example 11, wherein the instructions are further to identify the DL subframes and subframes that include a DwPTS that are DL subframes or subframes that include a DwPTS in a plurality of possible UL/DL configurations indicated in the SIB1 message.

Example 13 may include the one or more non-transitory computer-readable media of example 11, wherein the first one of the UL/DL configurations is the UL/DL configuration received in the SIB1 message.

Example 14 may include the one or more non-transitory computer-readable media of example 11, wherein the first one of the UL/DL configurations is a UL/DL configuration indicated by radio resource control (RRC) signaling.

Example 15 may include the one or more non-transitory computer-readable media of example 11, wherein the first one of the UL/DL configurations is the UL/DL configuration indicated in the PDCCH or the EPDCCH message in the first subframe or higher-layer configured subframes of the radio frame in the plurality of radio frames.

Example 16 may include the one or more non-transitory computer-readable media of any of examples 10-15, wherein the DRX timer is a DRX duration timer, a DRX inactivity timer, or a DRX retransmission timer.

Example 17 may include the one or more non-transitory computer-readable media of any of examples 10-15, wherein the UE is an enhanced interference mitigation and traffic adaptation (eIMTA)-enabled UE.

Example 18 may include a method comprising: receiving, at a UE, respective indications of a plurality of uplink/downlink (UL/DL) configurations applicable to subframes of a radio frame; identifying, by the UE based only on a first UL/DL configuration in the plurality of UL/DL configurations, DL subframes and subframes that include a downlink pilot time slot (DwPTS) in the subframes of the radio frame, wherein the identified DL subframes and subframes that include a DwPTS are UL subframes in a second UL/DL configuration in the plurality of UL/DL configurations; starting, by the UE, a timer related to a discontinuous reception (DRX) operation of the UE; monitoring, by the UE while the timer related to the DRX operation of the UE is running, a Physical Downlink Control Channel (PDCCH) or an enhanced PDCCH (ePDCCH) for a message only during the identified DL subframes and subframes that include a DwPTS; and incrementing, by the UE, the DRX timers based only on the identified DL subframes and subframes that include a DwPTS in the radio frame.

Example 19 may include the method of example 18, wherein an indication in the respective indications is received by the UE in a system information block type 1 (SIB1) message from an eNodeB (eNB).

Example 20 may include the method of example 19, further comprising identifying, by the UE, the first UL/DL configuration based only on the indication received in the SIB1 message.

Example 21 may include the method of example 19, wherein the indication is a first indication, and wherein: a second indication of the respective indications is received by the UE via radio resource control (RRC) signaling; and a third indication of the respective indications is received by the UE in a PDCCH or an ePDCCH message in a first subframe or higher-layer configured subframes of the radio frame.

Example 22 may include the method of example 21, further comprising identifying, by the UE, the DL subframes and subframes that include a DwPTS in the subframes of the radio frame based only on one of the second indication or the third indication.

Example 23 may include the method of any of examples 18-22, wherein the timer is a DRX duration timer, a DRX inactivity timer, or a DRX retransmission timer.

Example 24 may include the method of any of examples 18-22, wherein the UE is an enhanced interference mitigation and traffic adaptation (eIMTA)-enabled UE.

Example 25 may include an apparatus comprising means to perform the method of any of examples 18-24.

Although certain embodiments have been illustrated and described herein for purposes of description, this application is intended to cover any adaptations or variations of the embodiments discussed herein. Therefore, it is manifestly intended that embodiments described herein be limited only by the claims.

Where the disclosure recites "a" or "a first" element or the equivalent thereof, such disclosure includes one or more such elements, neither requiring nor excluding two or more such elements. Further, ordinal indicators (e.g., first, second or third) for identified elements are used to distinguish between the elements, and do not indicate or imply a required or limited number of such elements, nor do they indicate a particular position or order of such elements unless otherwise specifically stated.

What is claimed is:

1. One or more non-transitory computer-readable media comprising instructions that, when executed by one or more processors, are to:
identify, based on an indication of a downlink-reference (DL-reference) uplink/downlink (UL/DL) subframe configuration received via one or more radio resource control (RRC) signals, a value of k subframes associated with an interval between a DL transmission and a UL hybrid automatic repeat request (HARQ) feedback related to the DL transmission in accordance with the DL-reference UL/DL configuration;

identify a HARQ round-trip time (RTT) of k+4 subframes based on the value of k subframes; and perform a HARQ process related to the HARQ RTT of k+4 subframes.

2. The one or more non-transitory computer-readable media of claim 1, wherein the DL transmission is a physical downlink shared channel (PDSCH) transmission.

3. The one or more non-transitory computer-readable media of claim 1, wherein the DL transmission is a time division duplexed (TDD) DL transmission.

4. The one or more non-transitory computer-readable media of claim 1, wherein the HARQ process includes activation of a timer related to retransmission of the DL transmission in response to the UL HARQ feedback.

5. An apparatus comprising:
means to receive an indication of a downlink-reference (DL-reference) uplink/downlink (UL/DL) subframe configuration via one or more radio resource control (RRC) signals;
means to identify, based on the indication, a value of k subframes associated with an interval between a DL transmission and a UL hybrid automatic repeat request (HARQ) feedback related to the DL transmission in accordance with the DL-reference UL/DL configuration;
means to identify a HARQ round-trip time (RTT) of k+4 subframes based on the value of k subframes; and
means to perform a HARQ process related to the HARQ RTT of k+4 subframes.

6. The apparatus of claim 5, wherein the DL transmission is a physical downlink shared channel (PDSCH) transmission.

7. The apparatus of claim 5, wherein the DL transmission is a time division duplexed (TDD) DL transmission.

8. The apparatus of claim 5, wherein the HARQ process is a HARQ retransmission process.

9. A user equipment (UE) comprising:
a processor to:
identify, based on an indication of a downlink-reference (DL-reference) uplink/downlink (UL/DL) subframe configuration received via one or more radio resource control (RRC) signals, a first subframe associated with a DL transmission and a second subframe associated with a UL hybrid automatic repeat request (HARQ) feedback related to the DL transmission in accordance with the DL-reference UL/DL configuration;
identify, based on an interval between the first subframe and the second subframe, a value of k subframes; and
activate a timer related to a value of k+4 subframes; and
transceiver circuitry coupled with the processor, the transceiver circuitry to:
receive the DL transmission and the indication of the DL-reference UL/DL subframe configuration; and
transmit the UL HARQ feedback.

10. The UE of claim 9, wherein the DL transmission is a time division duplexed (TDD) physical downlink shared channel (PDSCH) transmission.

11. The UE of claim 9, wherein the value of k+4 subframes is related to a HARQ round-trip time (RTT).

12. The UE of claim 9, wherein the timer is related to a HARQ retransmission.

13. The UE of claim 9, where the DL transmission is a time division duplex (TDD) transmission.

14. An apparatus comprising:
one or more processors; and
one or more non-transitory computer-readable media comprising instructions, that when executed by the one or more processors, cause the one or more processors to:
identify, based on an indication of a downlink-reference (DL-reference) uplink/downlink (UL/DL) subframe configuration received via one or more radio resource control (RRC) signals, a value of k subframes associated with an interval between a DL transmission and a UL hybrid automatic repeat request (HARQ) feedback related to the DL transmission in accordance with the DL-reference UL/DL configuration;
identify a HARQ round-trip time (RTT) of k+4 subframes based on the value of k subframes; and
perform a timer related to the HARQ RTT of k+4 subframes.

15. The apparatus of claim 14, wherein the DL transmission is a physical downlink shared channel (PDSCH) transmission.

16. The apparatus of claim 14, wherein the DL transmission is a time division duplexed (TDD) DL transmission.

17. The apparatus of claim 14, wherein the timer is related to retransmission of the DL transmission in response to the UL HARQ feedback.

* * * * *